(12) United States Patent
Sage et al.

(10) Patent No.: US 7,973,512 B2
(45) Date of Patent: Jul. 5, 2011

(54) MOBILE TELEPHONE CHARGER WITH PROMOTIONAL AUDIO OUTPUT

(75) Inventors: Sean William Sage, Romeoville, IL (US); Patricio Nicolas Paucar, Carpentersville, IL (US); Narothum Saxena, Hoffman Estates, IL (US); Michael Irizarry, Algonquin, IL (US)

(73) Assignee: United States Cellular Corporation, Chicago, IL (US)

( * ) Notice: Subject to any disclaimer, the term of this patent is extended or adjusted under 35 U.S.C. 154(b) by 372 days.

(21) Appl. No.: 12/212,393

(22) Filed: Sep. 17, 2008

(65) Prior Publication Data

US 2010/0066306 A1 Mar. 18, 2010

(51) Int. Cl.
*H02J 7/00* (2006.01)
*H02J 7/02* (2006.01)

(52) U.S. Cl. ......... 320/107; 320/111; 320/114; 320/115
(58) Field of Classification Search .................... 320/107
See application file for complete search history.

(56) References Cited

U.S. PATENT DOCUMENTS

| | | | |
|---|---|---|---|
| 5,736,830 A | | 4/1998 | Weng |
| 5,903,135 A | * | 5/1999 | Posses et al. ................. 320/114 |
| 5,918,187 A | | 6/1999 | Weng |
| 5,966,285 A | | 10/1999 | Sellers |
| 5,977,747 A | | 11/1999 | Huang |
| 5,982,149 A | | 11/1999 | Shih |
| 6,076,000 A | | 6/2000 | Lee |
| 6,344,727 B1 | * | 2/2002 | Desai et al. ................... 320/107 |
| 6,377,826 B1 | | 4/2002 | Kaneko |
| 6,580,929 B1 | | 6/2003 | Chiu |
| 6,814,238 B2 | | 11/2004 | Lee |
| 6,950,320 B2 | | 9/2005 | Shin |
| 2004/0079668 A1 | | 4/2004 | Lee |
| 2005/0032554 A1 | | 2/2005 | Yang |
| 2005/0127870 A1 | | 6/2005 | Shin |
| 2007/0243908 A1 | * | 10/2007 | Lee ................................ 455/567 |

OTHER PUBLICATIONS

Product description and catalog page entitled "*Flatbatt*", obtained from the Internet on Jul. 1, 2008 at http://www.flatbatt.co.uk/Hands-Free/Handsfree/handsfree.html, (No specified date, but not later than applicant's filing date) (6 pages).
Product brochure entitled "Buckle Up. Enjoy the Tunes" from Sonnett Technologies, Inc. obtained from the internet on Jul. 1, 2008 at http://www.sonnettech.com/product/ifreq.html, Copyright 2007, (3 pages).
Internet product description and catalog page entitled "Plug-In Handsfree/Charger for Audiovox" obtained from the internet on Jul. 1, 2008 at http://www.cell-phone-accessories.com/hanfreplugch1.html, Copyright 2008, (2 pages).

* cited by examiner

*Primary Examiner* — Edward Tso
*Assistant Examiner* — Ahmed Omar
(74) *Attorney, Agent, or Firm* — Leydig, Voit & Mayer, Ltd.

(57) ABSTRACT

A mobile telephone charger capable of reproducing a promotional audio tune is provided comprising a housing, a power input connector attached to the housing for receiving an electrical power input, a power output connector attached to the housing for charging a mobile telephone responsive to the electrical power input, a power detector module for generating an enabling signal in response to detecting the electrical power input, an audio chip module responsive to the enabling signal for generating a predetermined audio signal, the predetermined audio signal corresponding to audio data stored in a computer readable medium disposed in the mobile telephone charger, and an audio transducer for generating an audio output in response to the predetermined audio signal.

20 Claims, 5 Drawing Sheets

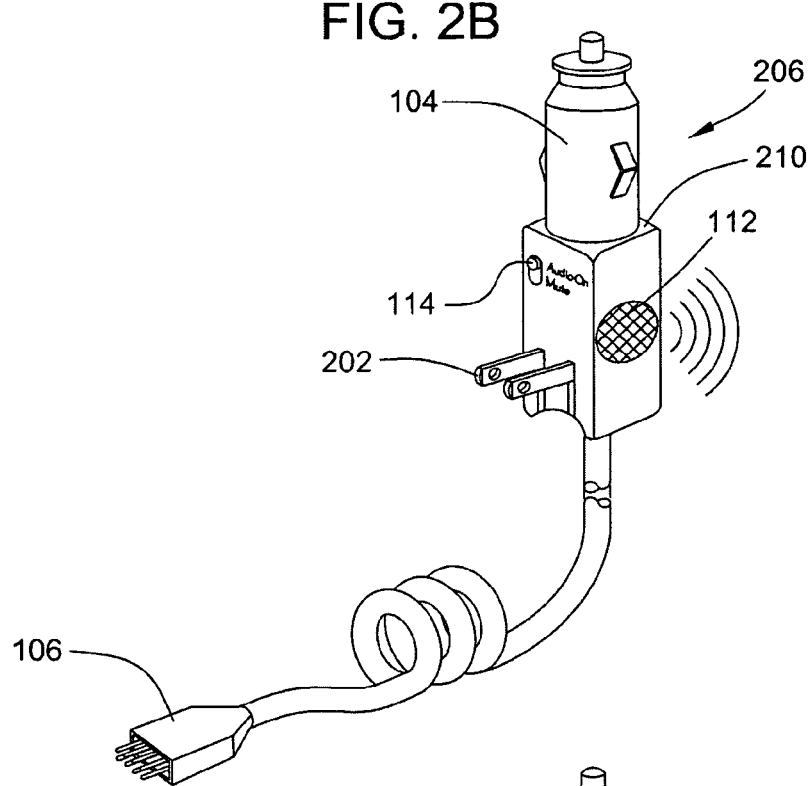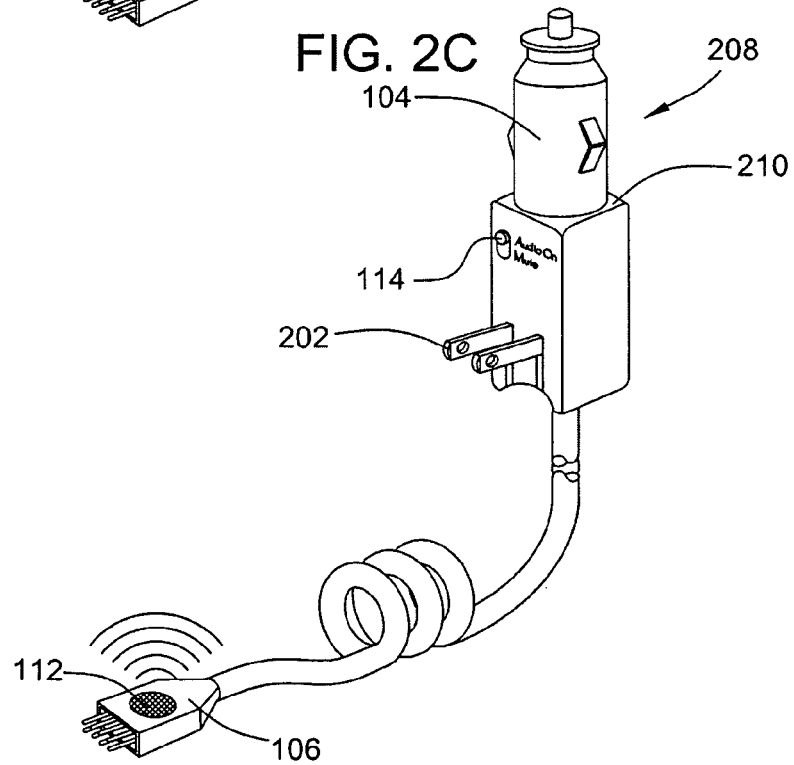

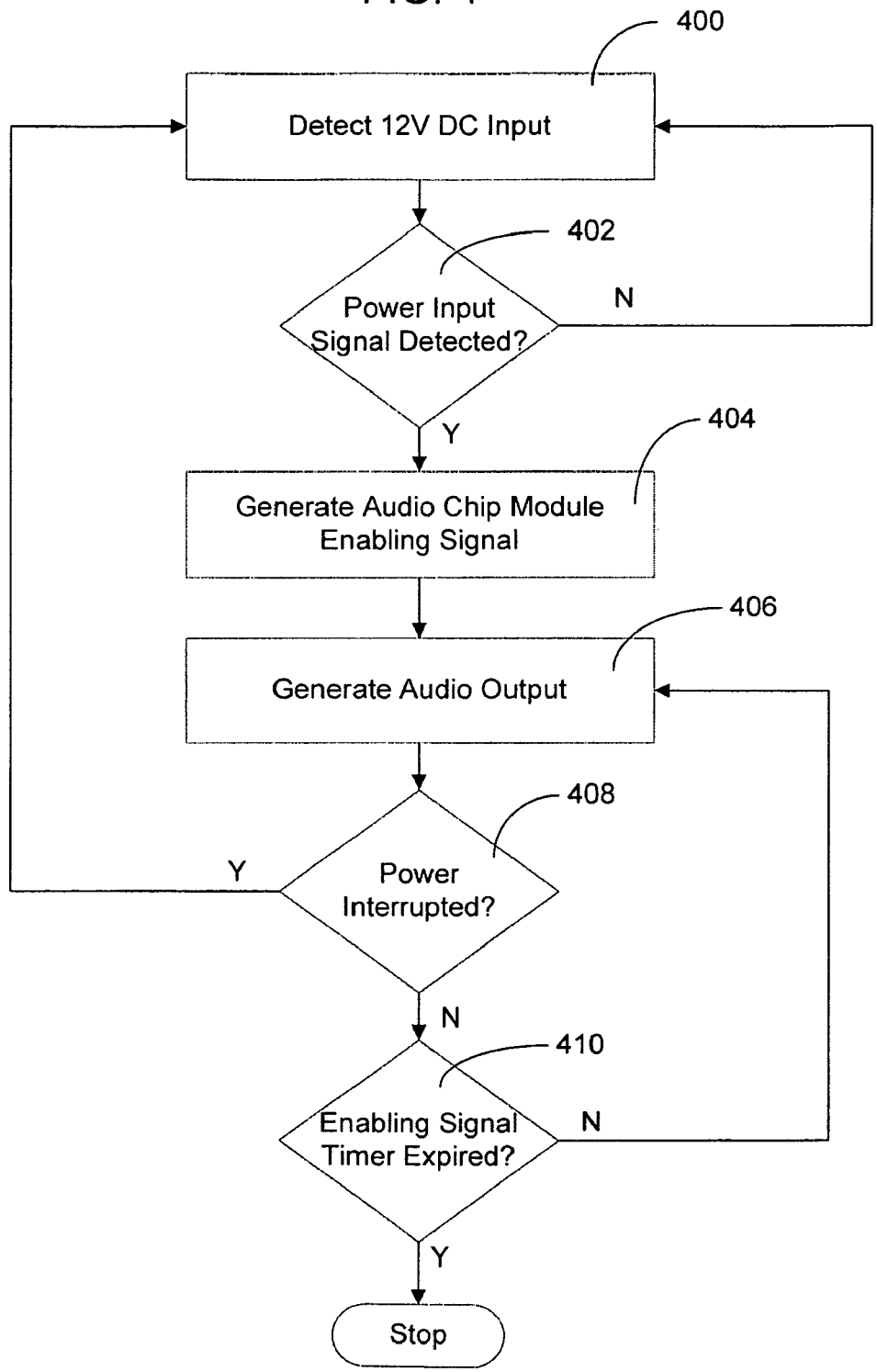

MOBILE TELEPHONE CHARGER WITH PROMOTIONAL AUDIO OUTPUT

FIELD OF THE INVENTION

This invention relates generally to the field of consumer electronics and more specifically to the field of electronic mobile telephone accessories.

BACKGROUND OF THE INVENTION

The marketplace for mobile telephone accessories includes a plethora of devices that enhance a customer's mobile communication experience and help build customer loyalty. Mobile telephone accessories include such items as phone chargers, custom face plates, and phone holsters. While household outlet compatible mobile phone chargers are typically packaged with a phone, car chargers are popular add-on accessories that provide continuous communication ability on the road, enhance customer safety, and help increase carrier revenue by facilitating usage.

In some cases, car chargers, are also packaged with a phone upon purchase or supplied as a promotional item in order to persuade the customer to purchase new equipment and sign up for a new mobile telephone service agreement. The customer may also separately purchase a car charger in a carrier's or accessory distributor's store. To promote the telephone carrier's brand awareness, the car charger and/or associated packaging may include the carrier's company logo. However, the identifying indicia on the packaging is discarded after its opening, while a company logo imprinted on the car charger itself fades or otherwise disappears due to daily wear and tear. Hence, a need exists to provide alternative solutions for promoting the carrier's brand awareness.

BRIEF SUMMARY OF THE INVENTION

To help differentiate a wireless carrier in a competitive wireless accessory marketplace and to further enhance brand awareness, embodiments of the invention are used to provide a mobile telephone charger capable of reproducing a promotional audio tune, such as a jingle used by the wireless carrier in connection with TV and radio commercial advertising, or a voice tag such as a company tag line, when the power is first applied to the charger.

In one aspect of the invention, a mobile telephone charger is provided comprising a housing, a power input connector attached to the housing for receiving an electrical power input, a power output connector attached to the housing for charging a mobile telephone responsive to the electrical power input, a power detector module for generating an enabling signal in response to detecting the electrical power input, an audio chip module responsive to the enabling signal for generating a predetermined audio signal, the predetermined audio signal corresponding to audio data stored in a computer readable medium disposed in the mobile telephone charger, and an audio transducer for generating an audio output in response to the predetermined audio signal.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIGS. 2B and 2C are schematic diagrams illustrating embodiments of a mobile telephone charger capable of emitting a predetermined audio signal and compatible with both a an automobile power input and a household power input;

FIG. 4 is a flow chart of a method for generating an audio output from a mobile telephone charger, in accordance with an embodiment of the invention.

DETAILED DESCRIPTION OF THE INVENTION

The following examples further illustrate the invention but, of course, should not be construed as in any way limiting its scope.

Figure 1:
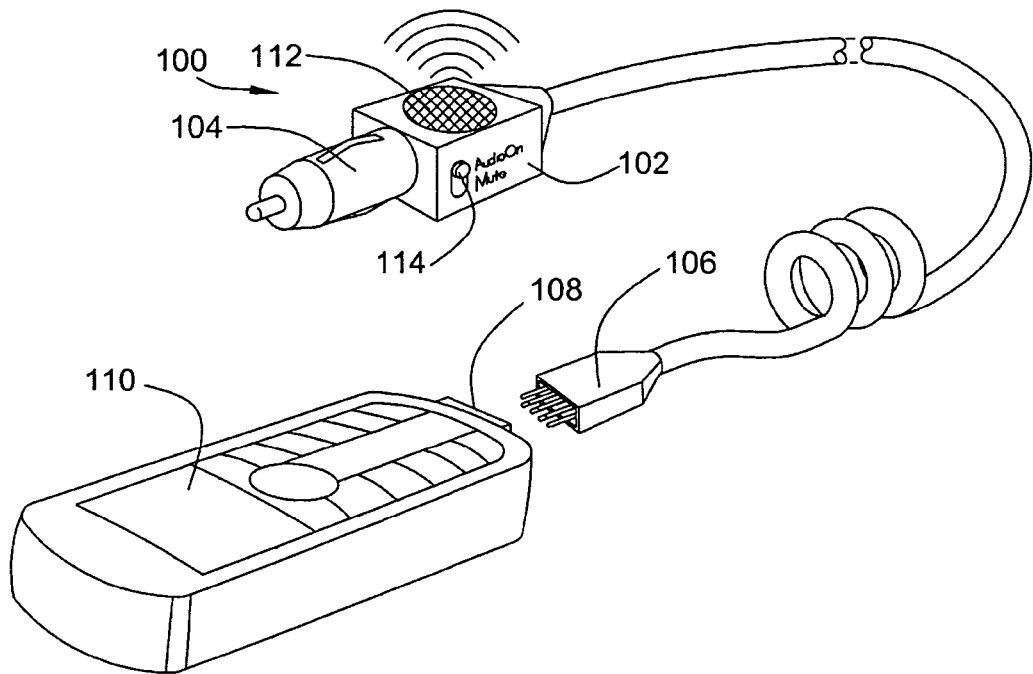
FIGS. 1 and 1A are schematic diagrams illustrating embodiments of a mobile telephone charger capable of emitting a predetermined audio signal and compatible with an automobile power input.

Turning to FIG. 1, an embodiment of a mobile telephone charger capable of emitting a predetermined audio signal is shown. Preferably, the charger 100 is an automobile charger having a housing 102 and a cigarette lighter power input connector 104 for receiving a 12V DC electrical power input from an automobile battery. The charger 100 further comprises a power output connector 106 compatible with a charging receptacle 108 of the mobile telephone 110 for delivering a charging signal (electrical current) to the internal battery. In one embodiment, the housing 102 includes charging circuitry for converting the electrical power input at the cigarette lighter connector 104 to the signal level accepted by the mobile phone 110. In another embodiment, the charging circuitry is disposed within the mobile phone 110.

Figure 1A:
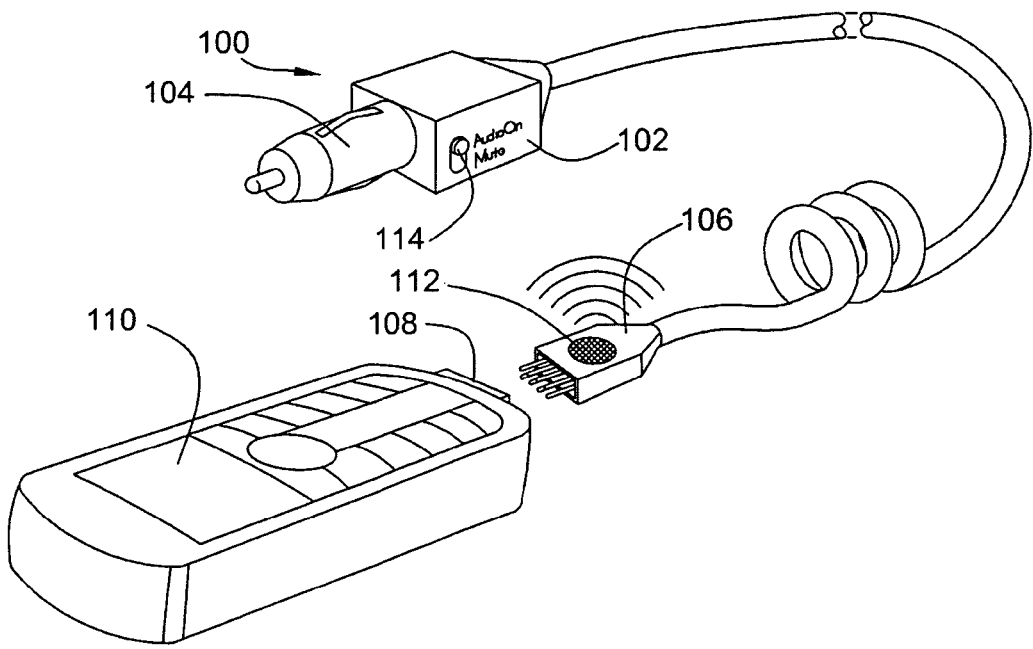
Figure 2:
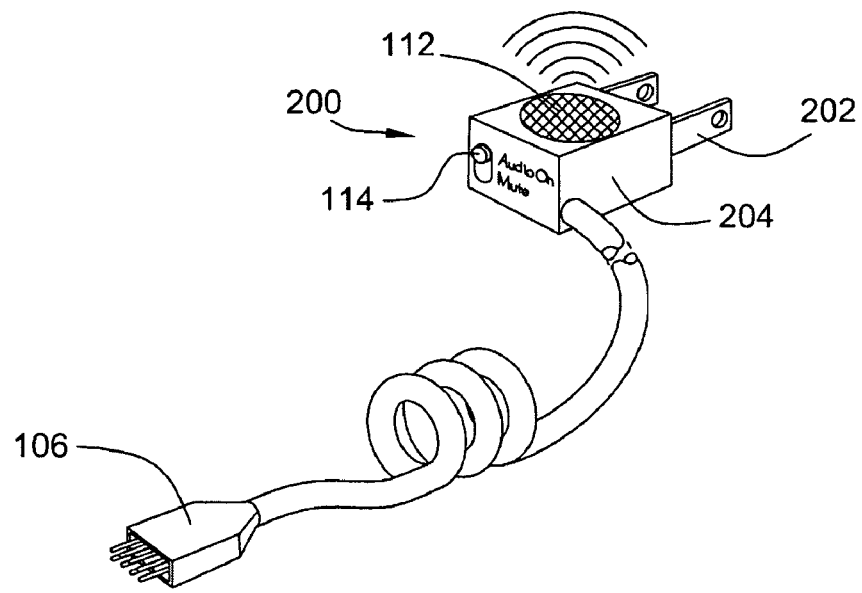
FIGS. 2 and 2A are schematic diagrams illustrating embodiments of a mobile telephone charger capable of emitting a predetermined audio signal and compatible with a household power input.
Figure 2A:
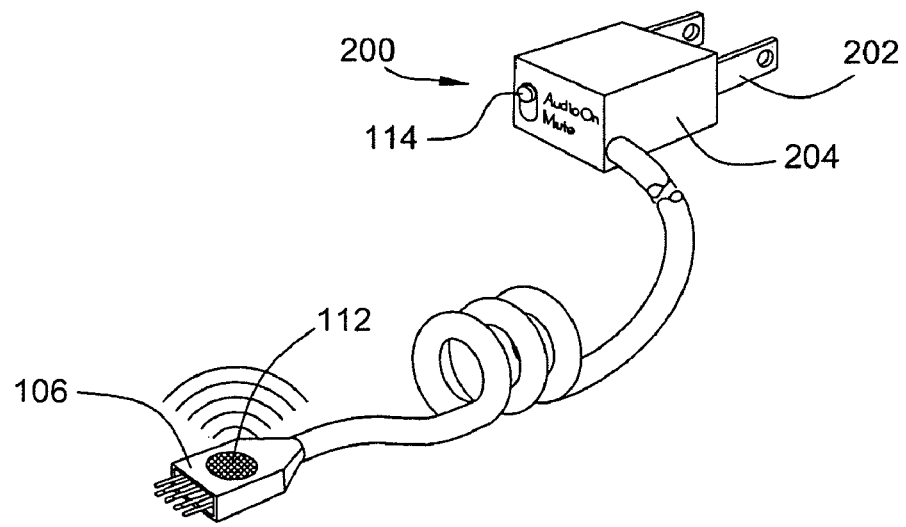

To enhance brand recognition, the charger 100 is capable of playing back prerecorded audio data stored within a computer readable medium (e.g., ROM or flash memory) disposed within its housing 102. Preferably, the audio data represents a tune or a voice tag immediately recognizable by a consumer as being associated with a particular company or its brand. In an embodiment, the audio data represents a tune or a voice tag used by a mobile telephone carrier during television or radio commercials. To this end, an audio transducer 112 is provided for playing back the stored audio data. In embodiments, the audio transducer 112 is either a speaker or a piezoelectric sound emitter (e.g., a buzzer) disposed within the housing 102 or within the power output connector 106 (FIG. 1A). In further embodiments illustrated in FIGS. 2 and 2A, the mobile telephone charger is a household plug-in type charger 200 where the power input connector 202 is an AC power plug and the housing 204 includes circuitry for converting the AC electrical power input to a DC charging signal compatible with the mobile phone 110. In such embodiments, the audio transducer 112 is disposed within the housing 204 (FIG. 2) or within the power output connector 106 (FIG. 2A). Preferably, the charger 100, 200 plays back the stored audio data for a predetermined duration upon detecting an input signal at the power input connector 104, 202, such as upon plugging the charger into a car power receptacle or a household AC power receptacle. Optionally, the charger 100, 200 further includes a switch 114 for defeating the playback of stored audio data. In one embodiment, the switch 114 slides between an "audio on" and "mute" positions to respectively activate and deactivate internal circuitry (FIG. 3) responsible for generating the playback of stored audio data. Additional embodiments include a combination car and household plug-in charger 206, 208, illustrated in FIGS. 2B and 2C, having a housing 210 that includes dual power input connectors 104, 202 for both car and household use. Preferably, the AC power plug connector 202 is foldable into the housing 210 to reduce the footprint of the charger 206, 208. In FIG. 2B, the transducer 112 is disposed within the housing 210, while the embodiment illustrated in FIG. 2C depicts transducer 112 being disposed within the power output connector 106.

Figure 3:
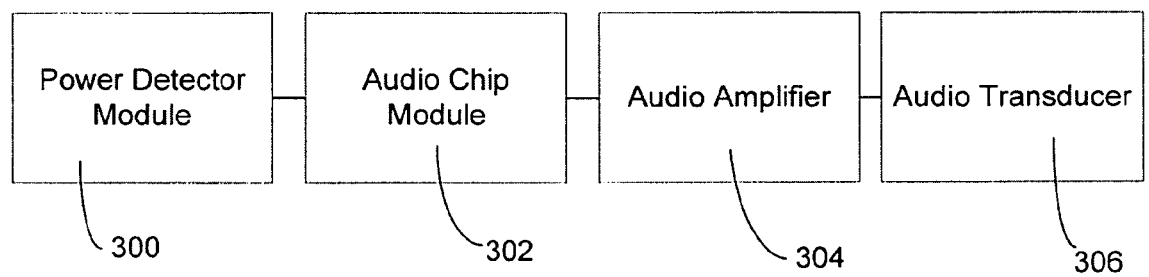
FIG. 3 is a schematic diagram of internal components of the charger that are responsible for generating a pre-recorded audio output, in accordance with an embodiment of the invention.

Turning to FIG. 3, an embodiment of internal components of mobile telephone charger that are responsible for generating a pre-recorded audio output is shown. The charger 100, 200 comprises a power detector module 300 which detects an input of electrical power at the power input connector 104, 202. The power detector module 300 includes circuitry (e.g., a resistor network) for generating an enabling signal to trigger the operation of the audio chip module 302. The audio chip module 302 comprises a controller, memory, and a digital-to-analog (D/A) converter, which may all be located on a single microchip or interconnected as a collection of discrete components. The memory of the audio chip module 302 is preferably preloaded with a set tune, or voice tag, and is not updateable by the user. Preferably, the audio chip module 302 initiates the playback of the stored audio data files from its memory upon receipt of the enabling signal from the power detector module 300. To this end, the line level audio output of the D/A converter of the audio chip module 302 is amplified to speaker level specifications by the audio amplifier 304 and played back via a transducer, such as a speaker 306.

Turning to FIG. 4, an embodiment of a method for generating an audio output from a mobile telephone charger is shown with reference to the automobile charger 100. In step 400, the charger 100 receives an electrical power input, such as a 12V DC power input from an automobile power outlet. The electrical power input is received upon plugging in the power input connector when the automobile is running. Likewise, when the charger 100 is left plugged into the automobile power outlet, the electrical power input is received when the ignition key is turned to power the accessory power outlet. For automobiles in which the accessory power outlet is active independent of the position of the ignition key, the electrical power input is received upon plugging in the charger 100 into the accessory power outlet. When the power detector module 300 detects a 12V DC power input signal, it generates an enabling signal to activate the audio chip module 302 and generate the output of stored audio data, steps 402-406. In step 408, when the 12V DC power is interrupted (e.g., the charger 100 is unplugged or ignition key is turned to the power off position), the power detector module 300 re-initiates detection of the power input signal (step 400). Otherwise, the process continues to step 410.

In the illustrated embodiment, the enabling signal is active during a predetermined duration, for example for the duration of a timer activated upon detection of the power input. In this case, the audio chip module generates the output of stored audio data for the duration of the enabling signal, step 410. Alternatively, the enabling signal activates a one-time playback of the stored audio data, such as until reaching an End Of File (EOF) indicator within the stored audio data. Thus, the charger 100 preferably plays back the stored audio tune once when the power is first applied or when the power is re-applied after an interruption (e.g., when the charger is plugged back into a power outlet).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A mobile telephone charger comprising:
a housing;
a power input connector attached to the housing for receiving an electrical power input;
a power output connector attached to the housing for charging a mobile telephone responsive to the electrical power input;
a power detector module for generating an enabling signal in response to detecting the electrical power input;
an audio chip module responsive to the enabling signal for generating a predetermined audio signal, the predetermined audio signal comprising a promotional audio tune corresponding to audio data stored in a computer readable medium disposed in the mobile telephone charger; and
an audio transducer for generating an audio output in response to the predetermined audio signal so as to play the promotional audio tune.

2. The mobile telephone charger of claim 1 wherein the enabling signal is of a predetermined duration.

3. The mobile telephone charger of claim 2 wherein the audio chip module generates the predetermined audio signal when the enabling signal is active.

4. The mobile telephone charger of claim 1 wherein the audio chip module generates the predetermined audio signal when the electrical power input has been restored.

5. The mobile telephone charger of claim 1 wherein the audio transducer is disposed in the housing.

6. The mobile telephone charger of claim 1 wherein the audio transducer is disposed in the power output connector.

7. The mobile telephone charger of claim 1 wherein the audio transducer is one of a speaker and a piezoelectric sound emitter.

8. The mobile telephone charger of claim 1 wherein the electrical power input is an automobile DC power input.

9. The mobile telephone charger of claim 1 wherein the electrical power input is a household AC power input.

10. The mobile telephone charger of claim 1 capable of receiving the electrical power input from an automobile DC power outlet and from a household AC power outlet.

11. The mobile telephone charger of claim 1 further comprising a switch for defeating the audio output.

12. A method for generating an audio output from a mobile telephone charger, the method comprising:
   detecting an electrical power input to the mobile telephone charger;
   generating an enabling signal in response to the detection;
   generating a predetermined audio signal responsive to the enabling signal, the predetermined audio signal comprising a promotional audio tune corresponding to audio data stored in a computer readable medium disposed in the mobile telephone charger; and
   generating the audio output from the mobile telephone charger in response to the predetermined audio signal so as to play the promotional audio tune.

13. The method of claim 12 wherein the enabling signal is of a predetermined duration.

14. The method of claim 13 further comprising generating the predetermined audio signal when the enabling signal is active.

15. The method of claim 12 further comprising generating the predetermined audio signal when the electrical power input has been restored.

16. The method of claim 12 wherein the audio output is generated via one of a speaker and a piezoelectric sound emitter.

17. The method of claim 12 wherein the electrical power input is an automobile DC power input.

18. The method of claim 12 wherein the electrical power input is a household AC power input.

19. The method of claim 12 wherein the mobile telephone charger is capable of receiving the electrical power input from an automobile DC power outlet and from a household AC power outlet.

20. A mobile telephone charger comprising:
   a housing;
   a power input connector attached to the housing for receiving an electrical power input;
   a power output connector attached to the housing for charging a mobile telephone responsive to the electrical power input;
   a power detector module for generating an enabling signal in response to detecting the electrical power input;
   an audio chip module responsive to the enabling signal for generating a predetermined audio signal, the predetermined audio signal comprising a promotional audio tune corresponding to audio data stored in a computer readable medium disposed in the mobile telephone charger, the audio chip module continuously generating the predetermined audio signal for a predetermined duration of the enabling signal; and
   an audio transducer for generating an audio output in response to the predetermined audio signal so as to play the promotional audio tune.

\* \* \* \* \*